June 7, 1960 M. G. JACOBSON 2,940,041

SEMICONDUCTOR DIODE CONSTRUCTIONS FOR USE IN GAS DETECTION

Filed May 6, 1957

INVENTOR.
Moses G. Jacobson
BY
Mason, Kolehmainen, Rathburn & Wyss
Attys

United States Patent Office 2,940,041

Patented June 7, 1960

2,940,041

SEMICONDUCTOR DIODE CONSTRUCTIONS FOR USE IN GAS DETECTION

Moses G. Jacobson, Penn Township, Allegheny County, Pa., assignor to Mine Safety Appliances Company, Pittsburgh, Pa., a corporation of Pennsylvania Filed May 6, 1957, Ser. No. 657,304

34 Claims. (Cl. 324—71)

The present invention relates generally to fluid detecting devices and, more specifically, to improved semiconductor type rectifiers or diodes for use in fluid detectors, particularly in light, portable gas detecting apparatus.

It has been known for some time that certain electrical properties of semiconductors are changed when their surface is exposed to certain gases and vapors such as, for example, oxygen, ozone, water vapor, alcohol vapor, and others. The various particles and gases that have been found to have an effect on the electrical characteristics of a semiconductor material are referred to herein generically as containing "electrically reactive particles," it being understood that this term includes ions, polar molecules, charged particles, easily polarized and easily ionizable molecules and atoms. Also, the electrical characteristics of a semiconductor which may be affected by such particles are surface potential, charge density, conductivity, work function, Fermi levels of electrons or holes, the mobility of electrons or holes, etc. While the diodes of the present invention are especially well suited for use in detecting gases and vapors containing these electrically reactive particles they may also be used in conjunction with liquid fluids or solid particles.

In applicant's copending application Serial No. 657,271, filed concurrently herewith and assigned to the same assignee as the present invention, it has been proposed to utilize the above described phenomena to detect the presence of these gases in the ambient atmosphere surrounding a semiconductor. As pointed out in this prior application, the most consistent and also the most practical method for utilizing the effect of gases and vapor on semiconductors for detection and quantitative determination of gases or vapors is to employ a device having one or more rectifying junctions between a semiconductor and a metal, or between a semiconductor and another semiconductor of different conductivity or, in general, a device with one or more junctions between two materials of substantially different conductivities providing rectifying action with respect to passage of electric current. Such a device usually has two terminals and is called a diode. Semiconductors are classified into N (negative) type and P (positive) type; in the N type semiconductors the majority of current carriers are negatively charged particles, which in germanium and silicon, according to the most accepted theory, are electrons; in the P type semiconductors the majority of current carriers have positive charges, and in germanium and silicon they are the so-called "holes" or localized electron deficiencies. In a germanium or silicon N type diode, rectification of alternating electric current occurs because in one direction of electric current flow, which is called the "forward direction," the current is carried by both the majority carriers (electrons in this case) and minority carriers (holes in this case) across the junction without much resistance, while in the other current direction, called the "reverse or inverse" or sometimes the "back" direction, only the minority carriers are crossing it freely. Thus, because the minority carriers are present only in small numbers and also in case of germanium and silicon have a lower mobility, the electrical resistance in the reverse direction is much higher than in the forward direction. In diodes formed by contact between an N type semiconductor and a metal, the inverse current direction is the one prevailing when the metal is connected to the negative pole and the semiconductor to the positive pole of a battery; in the "forward direction" the metal is connected to the positive terminal and the semiconductor to the negative terminal. For P type semiconductors all of the above polarities are reversed.

Thus far the generally accepted theories agree as to what occurs when rectification is produced by a semiconductor diode. But from here on, and especially as to explaining just why the majority carriers are prevented from crossing the junction when the polarity for the reverse direction is applied, the theories differ. No theory in existence at present is able satisfactorily to account even for all basic facts. Therefore, no further theoretical pictures or explanations shall be given in the present disclosure, and only descriptions of facts as established by experiments of applicant or others will be used except in those instances where the accepted theories can be used to lend understanding to the description.

As explained fully in the copending application referred to above, the sensitivities of the diodes of the present invention are first stabilized by passing a high forward current through a junction or contact between a semiconductor and another semiconductor or metal and, thereafter, the diodes are biased in the reverse direction to perform the measurements first in the presence of a standard gas and then in the presence of an ambient containing electrically reactive particles. The current flows through the junction instead of flowing along the surface of the semiconductor material. This creates several important differences; first, the current carriers must cross a semiconductor layer; second, due to the presence of the contacting or adjoining other conductors at the point of influence, the semiconductor surface in the vicinity of the contact or junction is charged, thus forming what is termed in some rectification theories a blocking layer; third, the ambient has to influence only the relatively small area adjacent the diode junction; and, fourth, the measurement of ambient effect is always performed with the current in the reverse direction using the change in number and mobility of minority carriers.

To provide a semiconductor device capable of determining the effects of an ambient a few basic considerations are of paramount importance. First, the device itself must be so designed that it possesses a high sensitivity to the ambient; that is, a relatively small change in the ambient produces a relatively large change in one or more of the electrical characteristics of the device being measured. In most of the prior investigations by others, as well as in the early stages of applicant's studies, it was necessary to employ vacuum tube amplifiers to observe the effects of gases and vapors even in high concentrations. Applicant has succeeded in developing gas detectors whereby it is now possible not only to observe the effects of gases and vapors when present in considerable concentrations, but to accurately measure many of them even when present in concentrations of the order of a few parts per million and to do this with ordinary commercial electric meters and relatively simple circuitry without any vacuum tube or other amplifiers. This has been achieved primarily by the development of the special type diodes of the present invention in which high densities of minority carriers are provided at places easily accessible to the gas to be tested. To obtain more energy change for a given gas or vapor concentration the diodes of the present invention employ line or area contacts or joints rather than point contacts, not only because the amount of electrical energy available is thus increased, but also because more mass action of the reactive gas or vapor is obtained due to the fact that more gas per unit time has access to the critical surface area of the contact or junction.

A second important feature which must be achieved to permit use of a semiconductor in the detection of an ambient is that the effect of such conditions as contact pressure and the like must be controllable so that consistent measurements can be obtained. This problem has been solved, in accordance with the present invention, by providing diodes in which the contact pressure can be manually adjusted.

A third factor to be considered is that the time required for the semiconductor device to respond to a change in ambient must be short so that the measurements can be made rapidly. By use of the devices of the present invention it is possible to reduce this response time to two minutes or less while in all prior experimentation a period of from five to twenty minutes was required following a change in the ambient. This desirable result has been achieved primarily by the combined effects of exposing a relatively small junction area to the ambient so that the electrical characteristics which vary as a result of the change in ambient reach a stable level rather quickly, and of allowing the gas or vapor to reach the junction area in a minimum of time.

In view of the foregoing discussion, it will be recognized that the principal object of the present invention is to provide novel semiconductor type rectifiers and diodes for use in a detecting device.

A further object of the present invention is to provide novel semiconductor type rectifiers and diodes which exhibit relatively large changes in one or more electrical characteristics in response to a change in concentration of electrically reactive particles in an ambient atmosphere.

Still another object of the present invention is to provide novel semiconductor type rectifiers and diodes which are sufficiently sensitive to changes in ambient that conventional electrical meters can be employed in measuring changes in electrical characteristics without requiring the use of electronic or other amplifiers.

It is also an object of the present invention to provide novel semiconductor type rectifiers and diodes having a very thing layer of semiconductor material at the junction, thereby to decrease the time required for reaching an equilibrium condition.

It is likewise an object of the present invention to provide novel semiconductor type rectifiers and diodes so constructed that the contact pressure may be manually adjusted in order to obtain consistent measurements.

Briefly, the above-mentioned and further objects are realized in accordance with the present invention by providing a gas detector employing a semiconductor type diode having a rectifying contact or junction formed by engagement between two dissimilar materials over an area substantially larger than conventional point contact diodes, yet small with respect to the available flow of fluid being tested. Special constructions are provided to bring the fluids to be tested into intimate contact with the junction area in the shortest possible time. Other constructional features provide freedom of the electric effect produced by the fluid components from the magnitude of the fluid flow.

The invention, both as to organization and method of operation, together with further objects and advantages thereof, will best be understood by reference to the following detailed description taken in connection with the accompanying drawing, in which.

The diodes of the present invention are of the type wherein the junction between conductors of unequal conductivity is formed by a semiconductor material in the form of a thin wafer in engagement with a tubular member formed either of another and different type semiconductor material or of a metal. The two principal semiconductive materials which have been employed are silicon and germanium, but it will be understood that other types of semiconductors may be used. It has been found that the surface states of semiconductors, and particularly silicon and germanium, are considerably affected not only by charged particles such as ions and electrons, but also by polar molecules such as water vapor, alcohol, acetone, etc. and also by those molecules which are easily polarized or ionized by weak electric fields, such as, for example, oxygen, chlorine, fluorine, etc. All such particles are hereinafter referred to as "electrically reactive particles."

A relationship between the rectifying properties of a diode and its sensitivity to vapors and gases has also been found. Thus, whenever a contact between a metal and a semiconductor or, in general, between two conductors of unequal conductivity, has rectifying characteristics, that is, conducts electric current in one direction more easily than in the other, there is also present sensitivity to fluid containing electrically reactive particles; that is, one or more of the electric characteristics determined by application of voltage across the diode to cause current flow in the reverse direction with air or a standard gas as an ambient changes when an ambient containing electrically reactive particles is introduced. However, this relationship is by no means quantitative. On the contrary, elements which have quite poor characteristics as rectifiers often have high sensitivities to gases and vapors and vice versa. For example, some germanium diodes with a ratio of 3 to 1 of forward to reverse current, which are quite worthless as rectifiers, have exhibited very high sensitivity to oxygen, water vapor, alcohol. But in all cases which applicant has thus far encountered, when rectification is entirely absent, sensitivity to gases and vapors is also absent.

In general, when a gas containing the electrically reactive particles described above is admitted to a semiconductor diode biased in the reverse direction, there are two more or less distinct effects: a fast one of the order of a fraction of a second, and a slow one in which equilibrium is reached in two minutes or longer. Applicant ascribes the reason for the slow change to the necessity for the electrons and holes in the interior to adjust themselves to the changed surface condition when the ambient is changed and then in turn influencing the surface condition. Consequently, it has been found advantageous to keep the bulk of the semiconductor material surrounding the junction as low as possible.

Figure 1:
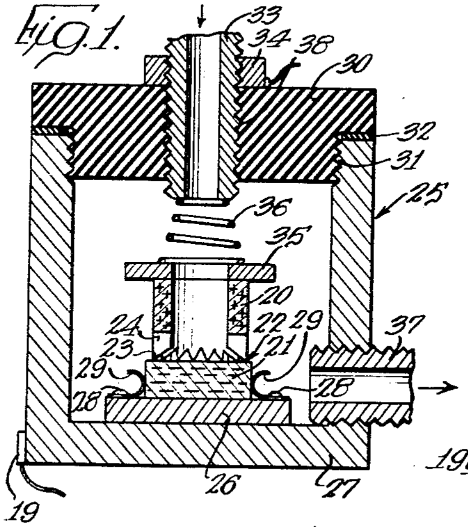
Fig. 1 is a greatly enlarged sectional view of a semiconductor type detector embodying the features of the present invention.

Referring now to the drawings, and particularly to Fig. 1 thereof, the present invention is there illustrated in an arrangement for bringing fluids such as gases or vapors into direct contact with the boundary or junction 22 formed between a P type semiconductor 20 and an N type semiconductor wafer 21. The semiconductor member 20 is a short tube or hollow cylinder of square, rectangular, oval or circular cross section but, in any case, its lower, open end is appropriately serrated as indicated at 23 so that it contacts or engages the upper flat surface of the wafer 21 at a number of points. The serrations need not be large and are greatly magnified in the drawings out of proportion for purposes of emphasis. In actual practice, these serrations are formed by lightly going over the lower edge of the member 20 with a small or medium file since their dimensions are not critical and may be varied within relatively wide limits without affecting the performance. The serrations have the effect of concentrating the power at the contact points while, at the same time, providing accessibility of the immediate contact area to the gases to be tested. To keep the electrical contact area from becoming too large with respect to the gas sample flow past it, the lower end of member 20 is tapered into a wedge-shape, as indicated at 24. Thus substantially a line type contact or junction, rather than an area type is provided in this embodiment. Moreover, because of this construction, the test gas easily and quickly penetrates to all parts of the electrical contact or junction, completely surrounding each of the protuberances or teeth of the serrated edge.

One of the principal advantages of this construction resides in the fact that a gas or vapor to be measured is quickly brought into contact with the exact site of the electrical and/or the electrochemical interaction between the electrically reactive particles in the gas and the electrical carriers existing at the junctions between the teeth 23 and the wafer 21.

The wafer 21 is carried upon a metal base 26 which, in turn, is secured as, for example, by screws 28 to the bottom wall 27 of a hollow, cylindrical metal housing indicated generally at 25. The screws 28 also hold U-shaped leaf springs 29 having bight portions in engagement with opposed edges of the wafer 21 for the purpose of holding the wafer in position on the base 26. The housing 25 also includes a cover or top wall 30 formed of insulating material and threaded into the side walls of the housing as indicated at 31. A gasket 32 provides a fluid-tight seal between the side walls and the cover 30. The cover is also provided with a central threaded bore 38 for accommodating an externally threaded tubular member 33 which is connected to a gas supply in order to deliver gases to the interior of the housing 25. A lock nut 34 is threaded onto the member 33 in order to hold the latter in position relative to the cover 30.

The upper end of the semiconductor 20 is secured in any suitable manner to the underside of an annular metal ring 35 and a coil spring 36 is interposed between this ring and the lower end of the tubular member 33 projecting into the interior of housing 25. One end of the spring 36 may be soldered or welded to the upper surface of the ring 35. The contact pressure between elements 20 and 21 may, of course, be adjusted by loosening the lock nut 34 and adjusting the position of member 33, thus changing the force exerted upon element 20 by the spring 36. Also, the element 20 need not be made of a semiconductor material but could instead be formed of metal. Moreover, if the element 20 is formed of semiconductor material, the wafer 21 may be made of metal. The only requirement is that elements 20 and 21 must possess different conductivities and they must provide rectifying action at their junction 22.

In view of the foregoing description, it will be recognized that inlet gases flow through the tubular member 33 to the interior of the housing 25 where they pass freely to the junction 22 both on the inside and outside and penetrate to the interstices of the serrations. The gas sample leaves the housing through an outlet 37. The electrical characteristics of the diode may be measured by circuits of the type described in the above-identified application Serial No. 657,271, which electrical circuits are connected to the gas inlet member 33 and to a suitable terminal 19 on the housing 25. Thus, the inlet member serves the dual function of directing the gas flow and of providing an electrical circuit connection. The coil spring 36 effectively isolates the elements 20 and 21 from vibrations or shock applied either to the housing 25 or to the gas inlet member 33 and, hence, the structure illustrated is particularly well suited for use in portable gas detectors which are adapted to be carried from place to place in making the electrical measurements referred to above.

Figure 2:
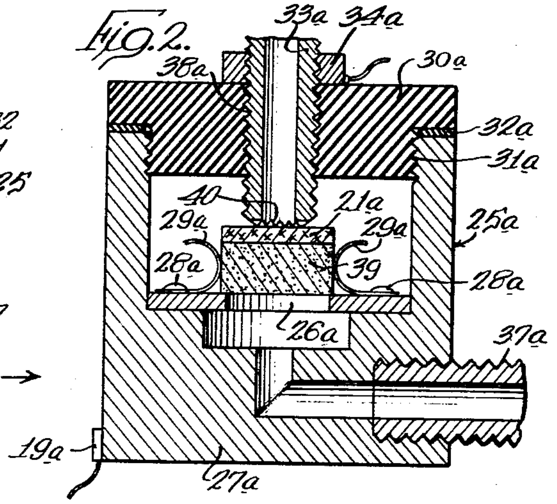
Fig. 2 is a sectional view similar to Fig. 1 but illustrating a second embodiment of the present invention.

The construction illustrated in Fig. 2 is similar in many respects to that shown in Fig. 1 and, accordingly, corresponding elements have been assigned reference numerals suffixed with the letter *a*. Thus, the cylindrical housing surrounding the diode shown in Fig. 2 has been assigned numeral 25*a*, the gas inlet tube has been assigned numeral 33*a* and so on. The principal difference between the structure illustrated in Fig. 2 and that shown in Fig. 1 is that the coil spring 36 has been eliminated and the lower edge of the metallic gas inlet tube 33*a* is brought into direct contact with the surface of a semiconductor 21*a* which, in this case, is a semiconductor layer or thin wafer attached to a supporting base 39, made of metal, graphite or any other material capable of providing an ohmic contact with the semiconductor used. Graphite blocks with thin layers of germanium or silicon are obtainable commercially. When semiconductors in the shape of wafers or in other forms are used, ohmic joints with a base can be obtained by various methods known in the art; for example, by first depositing on the semiconductor and non-metal parts a thin layer of a suitable metal, such as silver or copper by electro-plating or by a paste, and then joining the two parts by soldering. The lower edge of the gas inlet tube 33*a* is preferably serrated as indicated at 40 and is wedge-shaped as previously described. Thus, in the arrangement shown in Fig. 2, gas flows through member 33*a*, through the serrations 40 across the junction points between elements 33*a* and 21*a* and to the gas outlet 37*a* through openings in the base 26*a* which openings lie out of the plane of the cross section and hence are not shown. The bottom wall 27*a* is built up as illustrated so that the elements 21*a* and 33*a* are in engagement. The contact pressure between the latter elements may, of course, again be adjusted by releasing lock nut 34*a* and turning element 33*a*. The gas inlet pipe 33*a* again serves also as one electrical terminal of the diode, the other one being the housing 25*a*, as shown at 19*a*. Both of these terminals are made of a chemically inert metal such as, for example, stainless steel and are insulated from each other by the cover 30*a*. In some instances it may be advantageous to have the case 25*a* made of a plastic or other insulating material, in which case the pipe 37*a* may be used as the second terminal after being connected by a wire (not shown) to the base contacts 28*a*.

The embodiment of Fig. 2 in comparison with that of Fig. 1 has the advantage that all of the test gas or fluid sample flows directly to and through the sensitive junction. As a consequence, the sample reaches the zone of detection in the shortest possible time, and therefore a very fast response is obtained, and, as a result, the rate of actual of fluid fluid flow through the serrations can be made as large as desired and the mass action of the active components of the fluid is greatly increased, whereby high sensitivity to small concentrations is obtained.

Figures 3, 4, 5, 6:
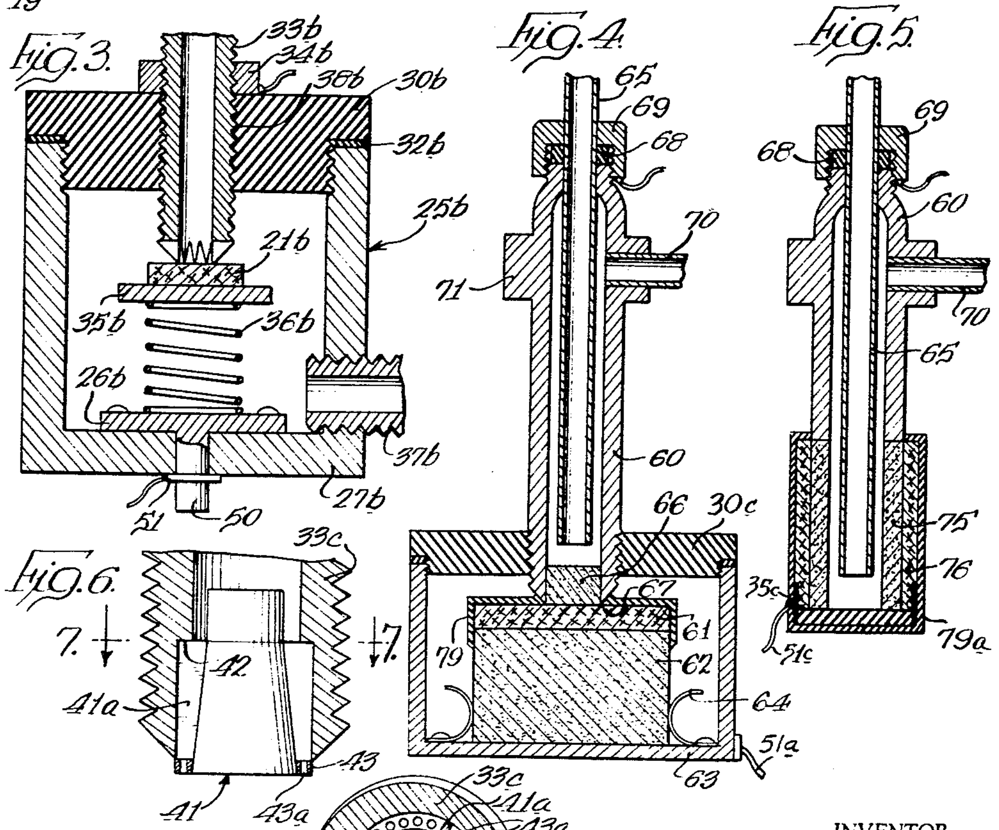
Fig. 3 is a sectional view similar to Figs. 1 and 2 but illustrating another form of diode construction characterized by the features of the present invention.
Fig. 4 is a longitudinal sectional view illustrating another embodiment of the invention.
Fig. 5 is a longitudinal sectional view illustrating another modification of the present invention.
Fig. 6 is an enlarged fragmentary view illustrating a plug which may be inserted within a gas conducting tube in accordance with an important feature of the invention.
Figure 7:
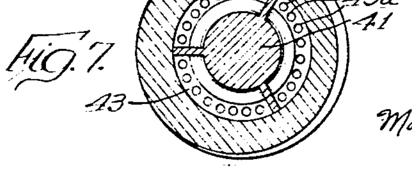
Fig. 7 is a sectional view taken along a line substantially corresponding to line 7—7 in Fig. 6.

Figs. 6 and 7 illustrate a modification of the structure shown in Fig. 2 in which a plug 41 is inserted into the lower end of gas inlet tube 33*c* for the purpose of directing the gases to the exact site of the electrical contacts or junction points without allowing them to reach the semiconductor surface encircled by the junction. The lower end of the tube 33*c* is counterbored to provide a shoulder 42 against which radially extending fins or arms 41*a* on the plug 41 are seated. As illustrated in Fig. 7, three such fins are spaced equidistantly about the periphery of the plug with the result that inlet gas flows from the tube 33*c*, along the space between the outer surface of plug 41 and the inner surface of the counterbore in the tube and through a plurality of apertures 43*a* in a ring 43 carried by the plug. The interstices between holes 43*a* in the lower edge of ring 43 engage the upper flat surface of a semiconductor material as, for example, the wafer 21*a* illustrated in Fig. 2, to form the contacts or junctions. Serrating of the ring 43 is not necessary since the unevenness created by drilling the holes 43*a* will generally provide sufficient opening for the escape of gas from within tube 33*c*. In this manner all of the inlet gas is directed to the exact points of engagement of the diode elements where it will have the greatest effect on the electrical characteristics, and adverse effects are minimized, which occur, when the inactive semiconductor surface encircled by the junction is left open to sorption of some components of the gases or fluids tested, as in the detectors of Figs. 1 and 2.

Fig. 3 illustrates an arrangement which represents a combination of the desirable features of the embodiments shown in Figs. 1 and 2 and has points of similarity with both of these. Thus, the elements, shown in Fig. 3 which correspond to similar elements in the structures shown in Figs. 1 and 2 have been suffixed by the letter *b*. Thus, the housing for the diode is identified as 25*b*, the gas inlet is identified as 33*b* and so on. In the modification shown in Fig. 3, the lower end of the gas inlet tube 33*b* is again serrated and wedge-shaped, so that it contacts or engages the upper surface of a disc or wafer of semiconductor member 21*b* is mounted upon a base plate 35*b* and a coil spring 36*b* acts against the underside of the base plate to urge elements 21*b* and 33*b* into engagement. Specifically, spring 36*b* is suitably secured at one end to a base 26*b* and at the other end is attached to the underside of plate 35*b*. Contact pressure may be adjusted by turning tube 33*b* within bore 38*b* of the cover 30*b*. The gas inlet tube 33*b* forms one terminal connection for the electrical circuit while a second terminal 50 is secured to base 26*b* and extends through the bottom wall 27*b* to receive a conductor 51. Gas thus flows through inlet tube 33*b*, across the junction between elements 21*b* and 33*b* and to the outlet tube or passage 37*b*. As may be seen from the construction, the embodiment of Fig. 3 combines the advantages of definite direct fluid flow right through the junction as provided by the device of Fig. 2, with resistance to shock and vibration and finer adjustability of the contact pressure as offered by the embodiment of Fig. 1 by virtue of the spring support.

Figs. 4 and 5 illustrate embodiments of the invention employing a porous member to bring the gases to the rectifying junction. Thus, Fig. 4 illustrates a diode of the contact type having a cylindrical upper electrode 60 of metal and a lower electrode formed by a layer 61 of germanium on a base 62 of graphite or the like. The base 62 is held upon the bottom of a housing 63 by means of opposed leaf springs 64. Inlet gas is delivered through an inner tube 65 to the interior of the electrode 60 where it passes by diffusion through a porous plug 66 to the junction 67 between elements 60 and 61. The plug 66 is made of porous carbon, porous metal or of a granular material which is capable of excluding by absorption or chemical action certain undesired gas components. Thus, if water vapor is to be excluded calcium chloride granules may be employed, while chlorine may be excluded by a mixture of activated carbon and soda lime, and so on. The exclusion of known gas components, of course, facilitates identification of the unknown components.

The inner tube 65 is sealed with respect to the electrode 60 in any suitable manner as, for example, by a sealing ring 68 disposed between the upper end of the electrode 60 and a cap 69 which surrounds the tube 65 and is threaded onto the electrode 60. An outlet tube 70 extends through the headpiece 71 of the electrode 60 and opens to the interior of the electrode in order to permit escape of gas flowing through the space between the outer surface of tube 65 and the inner surface of electrode 60. The enclosure or casing 63 is made of metal with a cover 30*c* of insulating material surrounding the lower part of the electrode 60. The electrode 60 may be threaded into a tapped opening in the cover 30*c* in order to adjust the contact pressure between the metal contact 60 and the semiconductor part 61. The semiconductor surface outside the contact area 67 is protected by a layer of insulating varnish or plastic 79. Electrical connection from terminal wire 51*a* to semiconductor layer 61 is made by way of the metal case 63 and supporting block 62.

It will be understood that by using a high rate of flow, the gas sample is brought in a very short time to the upper surface of porous block 66, and from there is conveyed to the junction area 67 by diffusion at a rate substantially independent of variations in the rate of sample flow. The actual thickness of the diffusion block being only a fraction of the size shown on the drawing, this arrangement does not slow down, but rather increases the overall speed of response, because of the higher rates of sample flow up to block 66.

In the construction illustrated in Fig. 5 the gas in the inlet tube 65 passes to the rectifying junction by diffusion through a porous material 75 which in this case consists of microporous stainless steel or another chemically inert conductor or semiconductor available in microporous form. The rectifying junction in this case is formed between the outer cylindrical surface of the porous material 75 and a layer of germanium or other semiconductor material 76 intimately surrounding layer 75. Such layers of germanium are most conveniently obtained by the same process of deposition in a vacuum as is used in making of the germanium and silicon layers on graphite already known in the art. However, hollow close fitting cylinders of semiconductor material may also be obtained by simple mechanical machining or by other methods. Thus, the porous material 75 also serves as one of the contacting electrodes and no other rectifying metal or semiconductive contact engages the surface of the semiconductor 76. Electrical connections are made to the element 76 by means of ohmic contact ring 35*c* and lead wire 51*c* and to the porous element 75 by way of member 60. The structure is enclosed within an insulating jacket of varnish or plastic 79*a*, thus avoiding the use of a separate housing.

While particular embodiments of the invention have been shown and described, it will be understood that many modifications will become readily apparent to those skilled in the art and it is, therefore, intended in the appended claims to cover any such modifications that fall within the true spirit and scope of the invention.

What is claimed as new and desired to be secured by Letters Patent of the United States is:

1. In a fluid detector, an enclosure, a conduit extending into said enclosure and defining a fluid passageway, means defining a fluid outlet from said enclosure, a rectifying device within said enclosure formed by the junction of two dissimilar materials, at least one of which is a semiconductor, a first of said materials being electrically connected to said conduit so that the latter functions as an electrical terminal, and another electrical terminal insulated from said conduit and connected electrically to the second of said materials.

2. In a fluid detector, a housing, inlet and outlet conduits of electrically conductive material insulated from each other, extending into said housing and defining fluid passageways, a rectifying device within said housing formed by the junction of two dissimilar materials, at least one of which is a semiconductor, a first of said materials being electrically connected to the inlet conduit so that the latter functions as an electrical terminal, and another electrical terminal on said housing insulated from said conduit and connected electrically to the second of said materials.

3. The apparatus defined by claim 2 wherein said first material is in the form of a tubular member in engagement with said second material.

4. The apparatus defined by claim 2 wherein said first member is in the form of a tubular member having an edge portion defining a plurality of spaced regions in engagement with said second material.

5. The apparatus defined by claim 3 wherein said second material is a thin semiconductor.

6. The apparatus defined by claim 5 wherein said semiconductor is in the form of a thin coating on a base material.

7. The apparatus defined by claim 6 wherein said base material is graphite.

8. The apparatus defined by claim 3 wherein said tubular member is provided with a serrated edge portion in engagement with said second material.

9. The apparatus defined by claim 2 wherein means are provided for adjusting said conduit relative to said housing in order to control the pressure of contact between said first and second materials.

10. The apparatus defined by claim 2 wherein said first material is part of said conduit and said conduit has an open end portion in engagement with said second material.

11. The apparatus defined by claim 10 wherein said open end portion is serrated to provide a plurality of points in engagement with said second material.

12. The apparatus defined by claim 2 wherein a coil spring is interposed between said first material and said conduit in order to provide an electrical connection and also to urge said first material into engagement with said second material.

13. The apparatus defined by claim 12 wherein said first material is in the form of a tubular member having an edge portion in engagement with said second material.

14. The apparatus defined by claim 13 wherein said edge portion is serrated to provide a plurality of spaced points in engagement with said second material.

15. The apparatus defined by claim 2 wherein said materials are separable and wherein a coil spring of electrically conductive material is disposed between said second material and said housing in order to urge said second material into engagement with said first material, said spring also forming the electrical connection between said second material and said other electrical terminal.

16. The apparatus defined by claim 15 wherein said first material is part of said conduit and the latter has an open end portion in engagement with said second material.

17. The apparatus defined by claim 16 wherein said open end portion is serrated to provide a plurality of spaced points in engagement with said second material.

18. The apparatus defined by claim 3 wherein a gas inlet tube extends within and is spaced from said conduit and said conduit is connected to a gas outlet passageway so that gas flows through said tube and then between said tube and said conduit to said outlet passageway, said conduit having an open end portion terminating adjacent said second material.

19. The apparatus defined by claim 18 wherein a porous member is disposed within the end portion of said conduit permitting diffusion of gas to said junction.

20. The apparatus defined by claim 19 in which said porous member is in the form of a plug closely fitting within the end portion of said conduit and said tube is provided with an open end terminating adjacent said plug.

21. The apparatus defined by claim 19 wherein said porous member is in the form of a tubular member surrounding said tube and disposed within the end portion of said conduit permitting diffusion of gas to the junction between said first and second materials.

22. The structure defined by claim 21 wherein said first material is in the form of a tubular member surrounding said conduit and having a surface portion in engagement with said second material to form said junction.

23. The apparatus defined by claim 21 wherein said porous member is of an electroconductive material, and said second material comprises a tubular member closely surrounding said porous member and in engagement with it at numerous points to form said rectifying junction.

24. The apparatus defined by claim 10 wherein structure is provided adjacent the open end portion of said conduit to divide the fluid flow into a plurality of streams flowing across said junction.

25. The apparatus defined by claim 23 wherein said structure includes a plug disposed within said end portion and having a plurality of spaced apart fluid passages leading from said conduit to the junction between said first and second materials.

26. In a device for detecting electrically reactive components in an ambient, a diode comprising two electrically dissimilar members intimately contacting to form a contact area, at least one of said members having a porous structure that extends up to and engages the other member to form said contact area.

27. A diode according to claim 26 wherein said porous material is of a chemically inert material.

28. A diode according to claim 27 wherein said inert material is carbon.

29. A diode according to claim 27 wherein said inert material is stainless steel.

30. In a fluid detector, a housing, electrically insulated inlet and outlet conduits extending into said housing and defining fluid passageways, at least one of said conduits being made of electroconductive material, a rectifying device within said housing formed by the junction of two dissimilar materials at least one of which is a semiconductor, at least one of said materials being electrically connected to said one conduit so that the latter can serve simultaneously as an electric terminal.

31. The structure defined by claim 21 wherein said porous material is of an electroconductive material and said second material is engaged with said first material at an area contact to form said rectifying junction.

32. The structure defined by claim 15 which further includes means for adjusting the force exerted by said spring in urging said separable materials into engagement, thereby to adjust the contact pressure between said materials.

33. In a fluid detector, an enclosure, means defining a fluid outlet from said enclosure, a rectifying device within said enclosure formed by the junction of two dissimilar materials at least one of which is a semiconductor, an inlet conduit extending into said enclosure and terminating adjacent said junction in order to deliver fluid to the interior of said enclosure in the immediate vicinity of the junction, a first of said dissimilar materials being electrically connected to said inlet conduit so that the latter also functions as an electrical terminal, and a second electrical terminal insulated from said inlet conduit and connected directly to the second of said materials.

34. In a fluid detector, a housing, electrically insulated inlet and outlet conduits extending into said housing and defining fluid passageways, a rectifying device within said housing formed by the junction of two dissimilar materials at least one of which is a semiconductor, the inlet conduit being made of electroconductive material and extending into said housing to terminate adjacent said junction so that fluids are delivered to said inlet conduit to a point in the immediate vicinity of the junction, at least one of said materials being electrically connected to said inlet conduit so that the latter also serves as an electrical terminal accessible from the exterior of the housing.

References Cited in the file of this patent

UNITED STATES PATENTS 2,711,511 Pientenpol ____________ June 21, 1955